(12) United States Patent
Jeon et al.

(10) Patent No.: US 10,795,537 B2
(45) Date of Patent: Oct. 6, 2020

(54) DISPLAY DEVICE AND METHOD THEREFOR

(71) Applicant: SAMSUNG ELECTRONICS CO., LTD., Suwon-si, Gyeonggi-do (KR)

(72) Inventors: Eun Jung Jeon, Goyang-si (KR); Jang Won Seo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 113 days.

(21) Appl. No.: 15/594,748

(22) Filed: May 15, 2017

(65) Prior Publication Data

US 2018/0181279 A1      Jun. 28, 2018

Related U.S. Application Data

(60) Provisional application No. 62/438,775, filed on Dec. 23, 2016.

(30) Foreign Application Priority Data

Mar. 9, 2017   (KR) ........................ 10-2017-0030185

(51) Int. Cl.
*G06F 3/0481*    (2013.01)
*G06F 3/147*    (2006.01)
(Continued)

(52) U.S. Cl.
CPC ........ *G06F 3/04817* (2013.01); *G06F 3/0482* (2013.01); *G06F 3/0484* (2013.01);
(Continued)

(58) Field of Classification Search
CPC .......................... G06F 3/04817; G06F 3/0482
See application file for complete search history.

(56) References Cited

U.S. PATENT DOCUMENTS

| | | | | |
|---|---|---|---|---|
| 7,805,682 | B1 * | 9/2010 | Lambourne | ........... G06F 3/0482 |
| | | | | 715/764 |
| 2006/0121939 | A1 * | 6/2006 | Anwar | ................. G06F 3/0482 |
| | | | | 455/556.2 |

(Continued)

FOREIGN PATENT DOCUMENTS

KR      10-2016-0104277         9/2016

OTHER PUBLICATIONS

Wilmington, "OneNote Tutorial", available: May 28, 2010, Wilmington University, https://www.wilmu.edu/adminaffairs/documents/onenote_tutorial.pdf, https://web.archive.org/web/20100528023932/https://www.wilnnu.edu/adminaffairs/documents/onenote_tutorial.pdf (Year: 2010).*

*Primary Examiner* — Seth A Silverman

(74) *Attorney, Agent, or Firm* — Nixon & Vanderhye P.C.

(57) ABSTRACT

A display device and a method therefor are provided. The display device is provided. The display device may include a display, an input module comprising input circuitry configured to detect or receive an input (e.g., a user input) from at least one input device, and a processor configured to zoom in on a specified first menu icon at a first zoom-in magnification from an original size if the input is for specifying the first menu icon in a menu icon list displayed on the display. The first zoom-in magnification may differ from a zoom-in magnification of a second menu icon from among other menu icons of the menu icon list.

16 Claims, 15 Drawing Sheets

(51) Int. Cl.
  *G06F 3/0482*   (2013.01)
  *H04W 4/80*   (2018.01)
  *G06F 3/0484*   (2013.01)
  *H04W 4/18*   (2009.01)
  *G09G 5/00*   (2006.01)

(52) U.S. Cl.
  CPC ............ *G06F 3/1475* (2013.01); *H04W 4/80* (2018.02); *G06F 2203/04806* (2013.01); *G09G 5/00* (2013.01); *G09G 2340/045* (2013.01); *G09G 2340/145* (2013.01); *H04W 4/18* (2013.01)

(56) References Cited

U.S. PATENT DOCUMENTS

| | | | |
|---|---|---|---|
| 2006/0143574 A1* | 6/2006 | Ito .................. | G06F 3/04817 715/800 |
| 2011/0145756 A1* | 6/2011 | Hama ................ | G06F 3/0482 715/784 |
| 2011/0154406 A1* | 6/2011 | Koo ................. | H04N 5/44543 725/56 |
| 2016/0034148 A1* | 2/2016 | Wilson ............... | G06F 3/04842 715/835 |
| 2016/0253051 A1 | 9/2016 | Kim et al. | |
| 2016/0335286 A1 | 11/2016 | Desineni et al. | |
| 2016/0335333 A1 | 11/2016 | Desineni et al. | |
| 2016/0335348 A1 | 11/2016 | Desineni et al. | |

\* cited by examiner

DISPLAY DEVICE AND METHOD THEREFOR

CROSS-REFERENCE TO RELATED APPLICATIONS

This application is based on and claims priority under 35 U.S.C. § 119 to a Korean patent application filed on Mar. 9, 2017 in the Korean Intellectual Property Office and assigned Serial number 10-2017-0030185; and U.S. Provisional patent application filed on Dec. 23, 2016 in the United States Patent and Trademark Office and assigned Ser. No. 62/438,775, the disclosures of which are incorporated by reference herein in their entireties.

TECHNICAL FIELD

The present disclosure relates generally to a display device for highlighting a specified menu icon in a menu icon list based on a user input and a method therefor.

BACKGROUND

A display device may display a function or a menu (e.g., an instruction to be executed) of a service as a menu icon easily identified by a user. The display device may highlight and display a menu icon specified in a menu icon list where menu icons are sorted, using a user input. For example, the display device may highlight the specified menu icon by zooming in on the specified menu icon. In this case, the display device may zoom in the specified menu icon using the same magnification as other menu icons on the menu icon list.

When zooming in on and displaying a specified menu icon in a menu icon list, the display device may overlay and display the zoomed-in menu icon on another menu icon. Herein, the menu icon overlaid by the zoomed-in menu icon may be a menu icon to be subsequently specified. The display device may cause confusion in a user's view in a process of highlighting the specified menu icon.

When zooming in on the specified menu icon, the display device may zoom in on the menu icon using a blank space between menu icons. However, if the display device zooms in on the specified menu within a range of the blank space between the menu icons, a range of zooming in on the menu icon may be limited.

SUMMARY

Example aspects of the present disclosure address at least the above-mentioned problems and/or disadvantages and provide at least the advantages described below. Accordingly, an example aspect of the present disclosure provides a display device for preventing and/or reducing information of another menu icon from being overlaid by a zoomed-in menu icon when the menu icon is zoomed in on and a method therefor.

In accordance with an example aspect of the present disclosure, a display device is provided. The display device may include a display, an input module comprising input circuitry configured to detect or receive an input from at least one input device, and a processor configured to zoom in on a specified first menu icon at a first zoom-in magnification from an original size if the input is for specifying the first menu icon in a menu icon list displayed on the display. The first zoom-in magnification may differ from a zoom-in magnification of a second menu icon from among other menu icons of the menu icon list.

In accordance with another example aspect of the present disclosure, a display method implemented by at least one processor is provided. The display method may include receiving a signal corresponding to an input from at least one input device, determining whether the input is for specifying a first menu icon in a menu icon list displayed on a display, and zooming in on the first menu icon at a first zoom-in magnification from an original size, if the input is for specifying the first menu icon. The first zoom-in magnification may differ from a zoom-in magnification of a second menu icon from among other menu icons of the menu icon list.

In accordance with another example aspect of the present disclosure, a computer-readable storage medium is provided. The computer-readable storage medium may store a program for performing a display method, the method including receiving a signal corresponding to an input from at least one input device, determining whether the input is for specifying a first menu icon in a menu icon list displayed on a display, and zooming in on the first menu icon at a first zoom-in magnification from an original size, if the input is for specifying the first menu icon. The first zoom-in magnification may differ from a zoom-in magnification of a second menu icon from among other menu icons of the menu icon list.

Other example aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
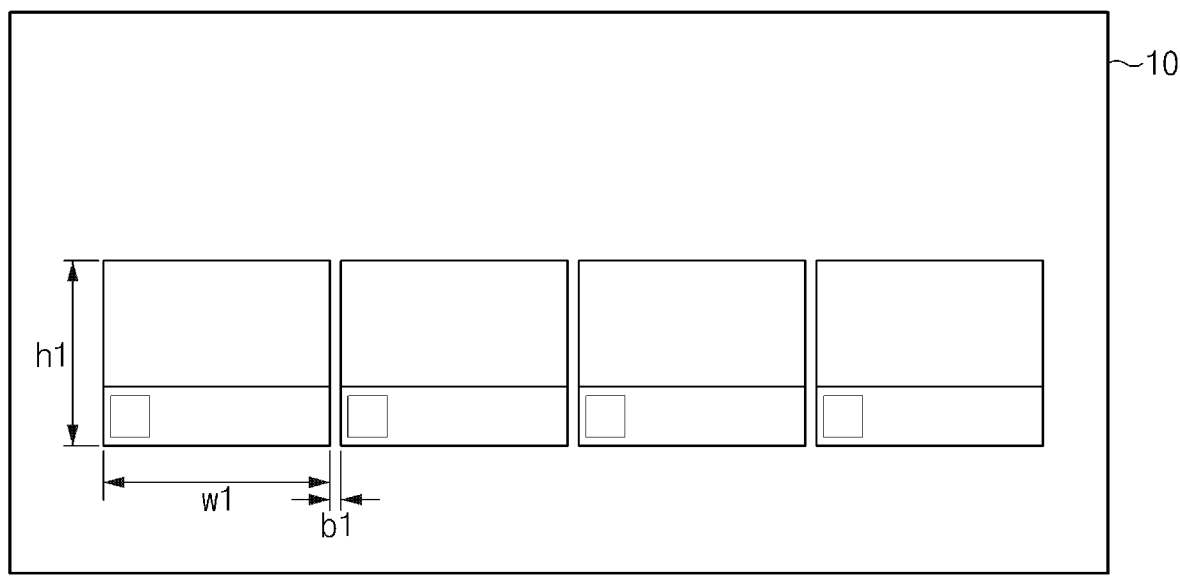
FIG. 1 is a diagram illustrating an example user interface (UI) screen of a display device which displays a menu icon list according to various example embodiments of the present disclosure.

Hereinafter, the present disclosure is described with reference to the accompanying drawings. However, the present disclosure is not intended to be limited to the specific illustrated example embodiments, and it is understood that it should include all modifications and/or, equivalents and substitutes within the scope and technical range of the present disclosure. With respect to the descriptions of the drawings, like reference numerals refer to like elements.

A display device (e.g., a display device 10 of FIG. 4) described in the present disclosure may include at least one of, for example, and without limitation, a television (TV), a monitor, a notebook, a large format display (LFD), a smartphone, a tablet personal computer (PC), a mobile phone, a video phone, an electronic-book (e-book) reader, a desktop PC, a laptop PC, a netbook computer, a personal digital assistant (PDA), a portable multimedia player, and an electronic frame.

FIG. 1 is a diagram illustrating an example user interface (UI) screen of a display device which displays a menu icon list according to various example embodiments of the present disclosure.

Referring to FIG. 1, according to various example embodiments, if an input, e.g., a user input, for displaying a menu icon list is verified, a display device 10 may display the menu icon list. The menu icon list may include a plurality of menu icons corresponding to different menus (e.g., execution instructions). Each of the plurality of menu icons may be at least one of, for example, a menu icon of an application, a menu icon of a document, and a menu icon of a function button.

According to various example embodiments, the display device 10 may highlight a specified menu icon by zooming in on the specified menu icon. For example, the display device 10 may highlight the specified menu icon in a different form, for example, may shade the specified menu icon, may display a periphery of the specified menu icon, or may change a color of the specified menu icon. However, in the present disclosure, a description will be given of components of the display device 10, which highlights the specified menu icon by zooming in on the specified menu icon.

According to various example embodiments, each menu icon may be configured by a first (e.g., original) size (e.g., w1×h1=S1). Also, there may be a blank space b1 between menu icons. It may be sufficient for the blank space b1 to cover an expansion region of a zoomed-in menu icon. Alternatively, it may be insufficient for the blank space b1 to cover the expansion region of the zoomed-in menu icon. Hereinafter, a description will be given of the latter as an example.

Figure 2A:
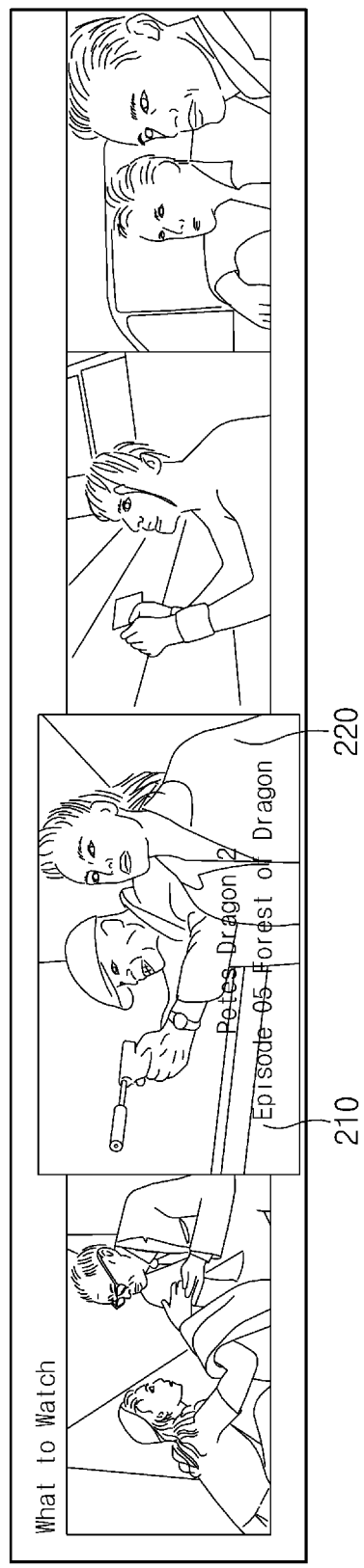
FIG. 2A is a diagram illustrating an example list of content playback menu icons according to various example embodiments of the present disclosure.
Figure 2B:
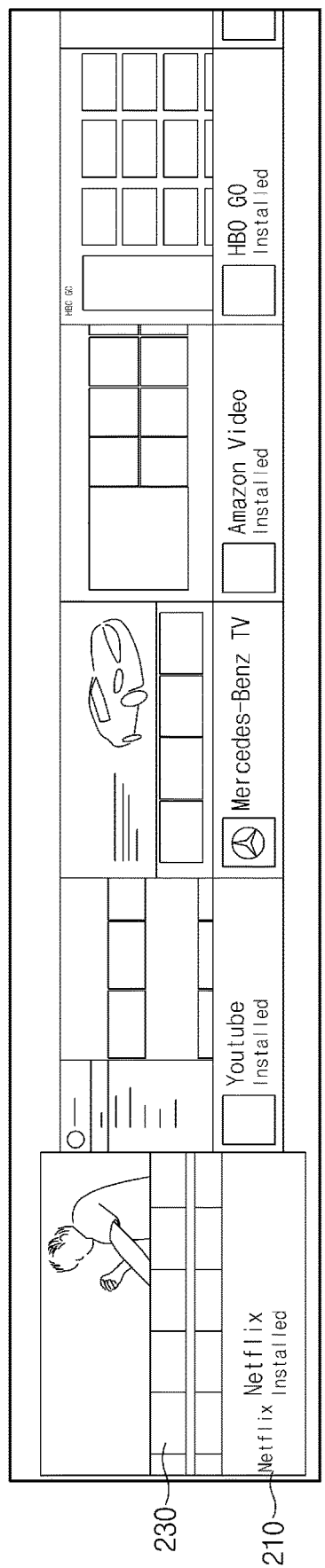
FIG. 2B is a diagram illustrating example application execution menu icons according to various example embodiments of the present disclosure.
Figure 2C:
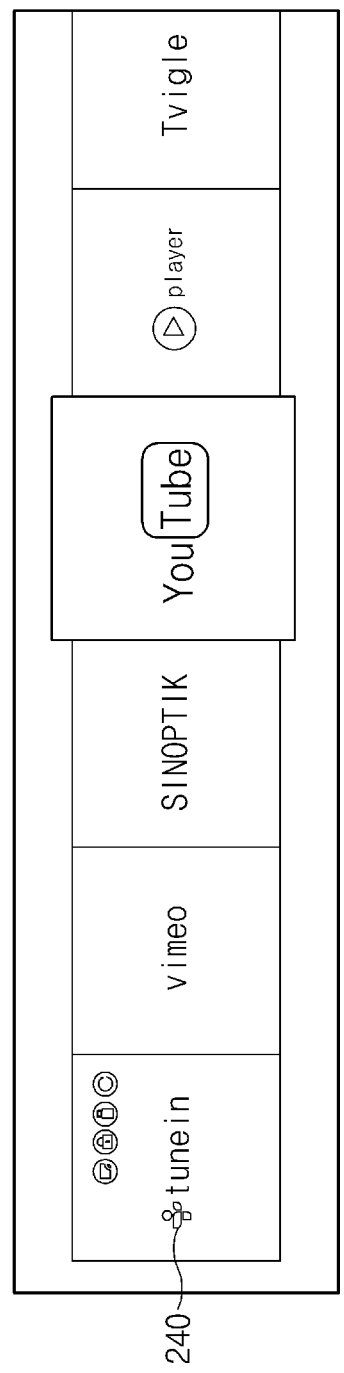
FIG. 2C is a diagram illustrating example channel change menu icons according to various example embodiments of the present disclosure.

FIGS. 2A, 2B and 2C are diagrams illustrating example menu icons according to various example embodiments of the present disclosure. FIGS. 2A to 2C illustrate an example of zooming in on one menu icon in a menu icon list.

FIG. 2A is a diagram illustrating an example list of content playback menu icons according to various example embodiments of the present disclosure.

Referring to FIG. 2A, a menu icon corresponding to each content playback menu may include at least one of a preview thumbnail image 220 and text 210 (e.g., a title of content) of each menu.

FIG. 2B is a diagram illustrating example application execution menu icons according to various example embodiments of the present disclosure.

Referring to FIG. 2B, a menu icon corresponding to each application execution menu may include at least one of a thumbnail image 230 and text 210.

FIG. 2C is a diagram illustrating example channel change menu icons according to various example embodiments of the present disclosure.

Referring to FIG. 2C, a menu icon corresponding to a channel change menu may include a channel logo 240.

Figure 3:
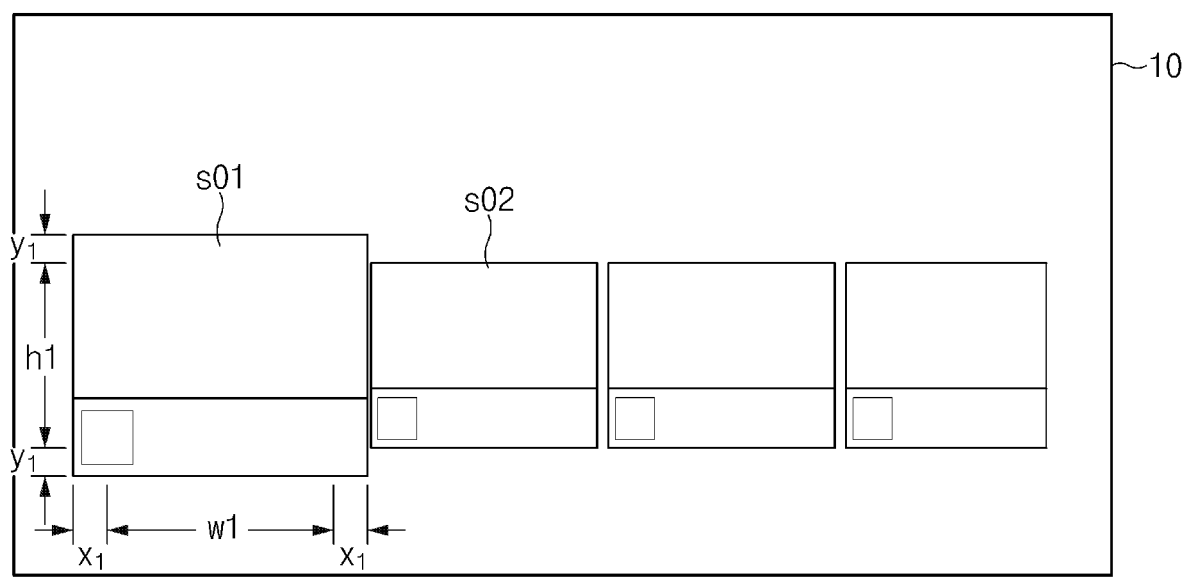
FIG. 3 is a diagram illustrating an example UI screen on which a specified menu icon is zoomed in on and displayed in a menu icon list according to various example embodiments of the present disclosure.

FIG. 3 is a diagram illustrating an example UI screen on which a specified menu icon is zoomed in on and displayed in a menu icon list according to various example embodiments of the present disclosure.

Referring to FIG. 3, according to various example embodiments, if one of menu icons is specified through a received input, e.g., a user input, a display device 10 may zoom in on a specified menu icon. For example, the display device 10 may zoom in on the specified menu icon from a first size to a second size. The zoomed-in menu icon s01 may be more extended by a width of 2×x1 than before being zoomed in on and may be more extended by a height of 2×y1 than before being zoomed in on.

According to various example embodiments, when zooming in on the specified menu icon, the display device 10 may move a location of at least one of the specified menu icon and another icon such that an information region of the other region (e.g., a menu icon s02) except for the specified menu icon is not overlaid by the zoomed-in menu icon s01. For example, if a menu icon list is arranged horizontally, when zooming in on the specified menu icon, the display device 10 may move a location of at least one of the specified menu icon and another menu in at least one of a left direction (a start direction of menu icons) and a right direction (a sort direction of the menu icons). For another example, if the menu icon list is arranged vertically, when zooming in on the specified menu icon, the display device 10 may move a location of at least one of the specified menu icon and another menu in at least one of an upper direction (a start direction of menu icons) and a lower direction (a sort direction of the menu icons). For convenience of description in the present disclosure hereafter, a description will be given of an example of horizontally arranging a menu icon list.

According to various example embodiments, the display device 10 may move at least one of a specified menu icon and another menu icon to maintain a blank space between a zoomed-in menu icon and a menu icon adjacent to the zoomed-in menu icon. Alternatively, the display device 10 may move at least one of the specified menu icon and the other menu icon such that at least part of the blank space between the zoomed-in menu icon and the menu icon adjacent to the zoomed-in menu icon is overlaid.

Figure 4:
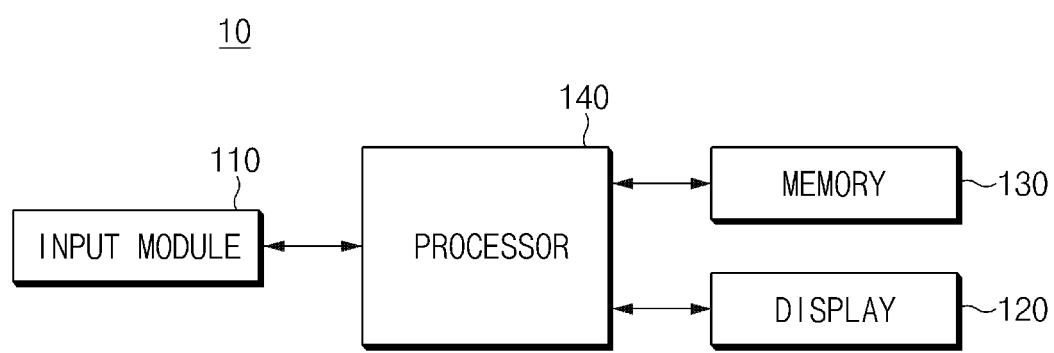
FIG. 4 is a block diagram illustrating an example configuration of a display device according to various example embodiments of the present disclosure.

FIG. 4 is a block diagram illustrating an example configuration of a display device according to various example embodiments of the present disclosure.

Referring to FIG. 4, according to various example embodiments, a display device 10 may include an input module (e.g., including input circuitry) 110, a display 120, a memory 130, and a processor (e.g., including processing circuitry) 140. In various example embodiments, some of the components may be omitted from the display device 10, or an additional component may be further included in the display device 10. Alternatively, in various example embodiments, some of the components may be combined to be configured as one entity, and functions of the components before the components are combined with each other may be performed in the same manner. An input and output relationship illustrated in FIG. 4 may be only an example for convenience of description. An embodiment of the present disclosure is not limited thereto.

According to various example embodiments, the input module 110 may include various circuitry configured to detect or receive an input, e.g., a user input. For example, the input module 110 may include various input circuitry, such as, for example, and without limitation, at least one of a touch sensor, a communication unit (e.g., including communication circuitry), and an input button. In various example embodiments, the touch sensor may sense a touch of an operation means and may output a touch coordinate of the operation means. For example, the touch sensor may include at least one of a touch pad (or a touch panel) and a touch controller (e.g., a touch integrated circuit (IC)), or the like, but is not limited thereto. The touch pad may be a touch screen. In various example embodiments, the communication unit may include various communication circuitry and communicate with a remote control device (e.g., a remote controller, a mouse, or the like). The communication unit may communicate with the remote control device using a variety of communication modes using various communication circuitry, such as, for example, and without limitation, Bluetooth, near field communication (NFC), infrared (IR) communication, a universal serial bus (USB), and a personal system/2 (PS/2). The communication unit may convert a control signal received from the remote control device into a control signal analyzable by the processor 140. The converted control signal may be provided to the processor 140. The communication unit may convert an instruction signal received from the processor 140 into an instruction signal corresponding to a communication mode with the remote control device and may transmit the converted instruction signal to the remote control device. In various example embodiments, the input button may be installed on the display device 10. For example, the input button may include at least one of movement buttons (e.g., upper, lower, left, and right movement buttons).

The display 120 may include, for example, a liquid crystal display (LCD), a light emitting diode (LED) display, an organic LED (OLED) display, or an electronic paper display, or the like, but is not limited thereto. The display 120 may display, for example, a variety of content (e.g., text, an image, a video, a menu icon, a system, and/or the like) to a user.

According to various example embodiments, the display 120 may display a menu icon list based on an instruction of the processor 140. In various example embodiments, the display 120 may zoom in on and display a specified menu icon in the menu icon list or may move a location of at least one of menu icons, based on an instruction of the processor 140.

The memory 130 may be a volatile memory (e.g., a random access memory (RAM) or the like), a non-volatile memory (e.g., a read only memory (ROM), a flash memory, or the like), or a combination thereof. The memory 130 may store, for example, an instruction or data associated with at least another component of the display device 10. According to various example embodiments, the memory 130 may store instructions for highlighting a specified menu icon in a menu icon list. The memory 130 may store instructions for preventing information of another menu icon from being overlaid by a zoomed-in menu icon when a specified menu icon is zoomed in on.

The processor 140 may include various processing circuitry, such as, for example, and without limitation, at least one of a dedicated processor, a central processing unit (CPU), a graphics processing unit (GPU), a microprocessor, an application processor, an application specific integrated circuit (ASIC), and field programmable gate arrays (FPGA) and may have a plurality of cores. The processor 140 may perform an arithmetic operation or data processing about control and/or communication of at least another component of the display device 10.

According to various example embodiments, the processor 140 may receive a signal corresponding to a user input from the input module 110. If receiving the signal corresponding to the user input, the processor 140 may verify whether the received signal is for specifying one menu icon (e.g., a first menu icon) in a menu icon list displayed on the display 120. For example, the processor 140 may verify whether the received signal is a first signal for displaying the menu icon list displayed on the display 120. The first signal may be a signal received as a user input for displaying the menu icon list is selected via the input module 110. For another example, the processor 140 may verify whether the received signal is a second signal for specifying another menu icon in a state where one menu icon is zoomed in on a menu icon list. The second signal may be a signal received as a user input for changing and specifying a menu icon is selected (as directional key is operated) using the input module 110.

According to various example embodiments, if receiving a signal for specifying a menu icon, the processor 140 may zoom in a specified menu icon to highlight the specified menu icon. For example, if the first signal is received, the processor 140 may zoom in on and display a first menu icon designated as a default, for example, a primary menu icon of a menu icon list. For another example, if the second signal is received, the processor 140 may zoom out on a previously zoomed-in menu icon and may zoom in on and display another menu icon.

According to various example embodiments, the processor 140 may zoom in on the specified menu icon with respect to a reference point. For example, the processor 140 may zoom in on the specified menu icon from a first size (an original size) to a second size with reference to the center of the specified menu icon. For another example, the processor 140 may zoom in on the specified menu icon at a specified magnification (e.g., 1.3 times) to the four winds with respect to the center of the specified menu icon.

According to various example embodiments, when zooming in on the specified menu icon, the processor 140 may highlight a process of zooming in on the specified menu icon. For example, the processor 140 may perform a process, for gradually zooming in on the specified first menu icon from the first size to a third size (the third size>the second size) and zooming out on the specified first menu icon to the second size, at least once. Thereby, the processor 140 may zoom in on a specified first menu icon from the first size to the second size. For another example, the processor 140 may gradually zoom in on the specified first menu icon from the first size to the third size and zoom out on the specified first menu icon to a fourth size (the first size<the fourth size<the second size), at least once. Thereby, the processor 140 may zoom in on the specified first menu icon from the first size to the second size.

According to various example embodiments, the processor 140 may zoom in on all of menu icons at the same size or magnification. Alternatively, the processor 140 may zoom in on a specific menu icon at a larger size or higher magnification than that of a general menu icon except for the specific menu icon. For example, the processor 140 may zoom in on the general menu icon to 1.3 times of the first size (original size) and may zoom in on the specific menu icon to 1.5 times of the first size. For another example, the processor 140 may zoom in on a first menu icon at a first zoom-in magnification of the original size. The first zoom-in magnification may differ from a zoom-in magnification of a second menu icon among other menu icons. For example, the zoom-in magnifications may be specified to be bigger for a menu icon which requires more emphasis. According to various example embodiments, the processor 140 may zoom in further for a menu icon which requires more emphasis. Thus, in various example embodiments, a user may focus more on a menu icon which requires more attention among menu icons.

According to various example embodiments, the processor 140 may move at least one of a specified menu icon and another menu icon such that information of the other menu icon is not overlaid by a zoomed-in menu icon. For example, the processor 140 may verify whether there is an available space sufficient to zoom in on the specified menu icon. If there is the available space sufficient to zoom in on the specified menu icon as a result of the verification, the processor 140 may move a location of the specified menu icon while zooming in on the specified menu icon. The available space may be at least one of a space available due to zooming out of a previously zoomed-in menu icon and the blank space. For another example, if there is no the available space sufficient to zoom in on the specified menu icon, the processor 140 may move a location of another menu icon while zooming in on the specified menu icon. In various example embodiments, the processor 140 may overlay the specified menu icon on another icon while zooming in on the specified menu icon. As such, in various example embodiments, as at least one of menu icons is moved, since the zoomed-in menu icon may be processed not to be overlaid with an information region of another menu icon, the user may easily identify a menu icon in a process of specifying the menu icon.

According to various example embodiments, the processor 140 may move a location of at least one of a specified menu icon and another menu icon such that a zoomed-in menu icon is not at all overlaid with the other menu icon. Alternatively, the processor 140 may move a location of at least one of the specified menu icon and the other menu icon such that the zoomed-in menu icon is not overlaid with an information region of the other menu icon. For example, each menu icon may include an information region including information of each menu icon and a background region other than the information region. The background region may be an area except for the information region. The processor 140 may move at least one of the specified menu icon and the other menu icon such that the zoomed-in menu icon is not overlaid with an information region of the other menu icon. For another example, the processor 140 may shade the zoomed-in menu icon. In this case, the processor 140 may process that a shadow of the zoomed-in menu icon is not overlaid with the information region of the other menu icon.

According to various example embodiments, the processor 140 may move at least one of a specified menu icon and another menu icon based on a sort order of the specified menu icon. For example, all of menu icons of a menu icon list are zoomed in on at the same magnification. In this case, if the specified menu icon is a primary menu icon or a secondary menu icon in the menu icon list, the processor 140 may move the other menu icon. Also, if a first menu icon is a tertiary menu icon or a menu icon subsequent to the tertiary menu icon of the menu icon list, the processor 140 may move only a location of a previously zoomed-in menu icon and only a location of the specified menu icon.

According to various example embodiments, when zooming in on the specified menu icon, the processor 140 may move at least one of the first menu icon and another menu icon in consideration of a blank space between the specified menu icon and a menu icon adjacent to the specified menu icon. For example, when zooming in on the primary menu icon of the menu icon list, the processor 140 may move the other menu icon in a sort direction of menu icons by a value in which a blank space (e.g., a blank space b1) between the primary menu icon and the secondary menu icon is subtracted from an extension length (e.g., x1) in a sort direction of the primary menu icon. For another example, when zooming in on the secondary menu icon after the primary menu icon of the menu icon list is zoomed in on, the processor 140 may move the other menu icon in a sort direction of the menu icons by a value in which a blank space (e.g., a blank space b1) between the secondary menu icon and the tertiary menu icon is subtracted from an extension length (e.g., x1) in a sort direction of the secondary menu icon. In various example embodiments, the processor 140 may move locations of menu icons such that there is no blank space between a zoomed-in menu icon and a menu icon adjacent to the zoomed-in menu icon. Contrary to the above-mentioned embodiments, the processor 140 may move at least one of the specified menu icon and another menu icon to maintain a blank space between the zoomed-in menu icon and a menu icon adjacent to the zoomed-in menu icon.

According to various example embodiments, the processor 140 may move at least one of a specified menu icon and another menu icon based on a zoom-in magnification of the specified menu icon and a zoom-in magnification of a previously zoomed-in menu icon. For example, if the zoom-in magnification of the specified menu icon is the same as the zoom-in magnification of the previously zoomed-in menu icon, the processor 140 may a location of move at least one of the specified menu icon and the other menu icon based on a sort order. For another example, if the zoom-in magnification of the specified menu icon differs from the zoom-in magnification of the previously zoomed-in menu icon, the processor 140 may verify a difference between a zoom-in size of the previously zoomed-in menu icon and a zoom-in size of the specified menu icon. If the difference between the zoom-in size of the previously zoomed-in size and the zoom-in size of the specified menu icon is a positive value, the processor 140 may move at least one of the specified menu icon and the other menu icon in a start direction of menu icons. If the difference between the zoom-in size of the previously zoomed-in size and the zoom-in size of the specified menu icon is a negative value, the processor 140 may move at least one of the specified menu icon and the other menu icon in a sort direction of the menu icons.

According to various example embodiments, when zooming in on a specified menu icon, the processor 140 may zoom out on a previously zoomed-in menu icon to an original size (first size). When zooming out on the previously zoomed-in menu icon to the original size, the processor 140 may move the previously zoomed-in menu icon to an original location. For example, the processor 140 may verify whether the previously zoomed-in menu icon is moved while zoomed in on. If the previously zoomed-in menu icon is moved while zoomed in on, the processor 140 may move the previously zoomed-in menu icon to the original location (or a location before being moved) while zooming out on the previously zoomed-in menu icon.

According to various example embodiments, it may be improved that a problem in which information of another menu icon is overlaid by a zoomed-in menu icon as at least one of menu icons may be moved if a blank space between menu icons is narrow.

Figure 5A:
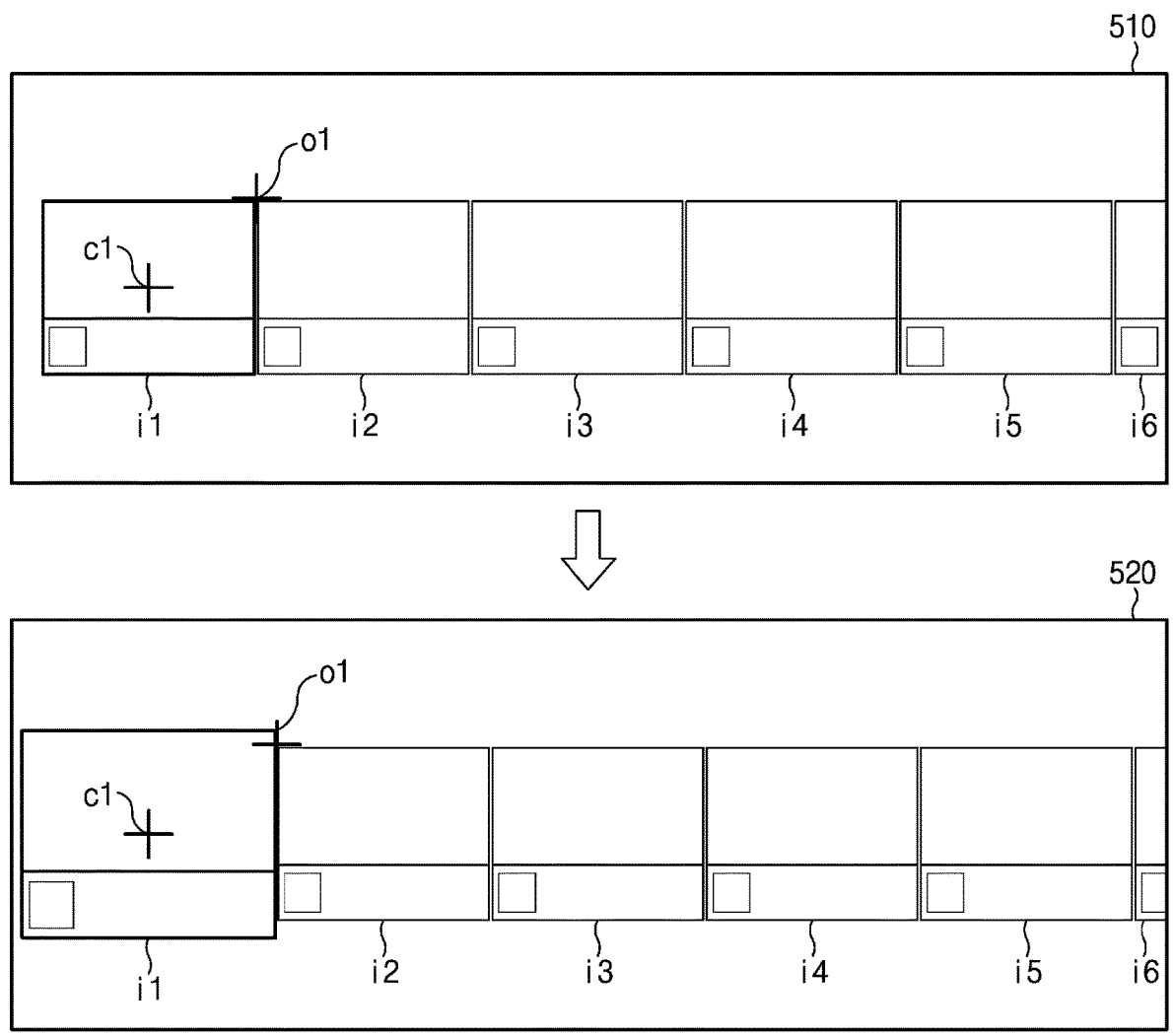
FIG. 5A is a diagram illustrating an example UI screen in a process of zooming in on a first menu icon of a menu icon list according to various example embodiments of the present disclosure.
Figure 5B:
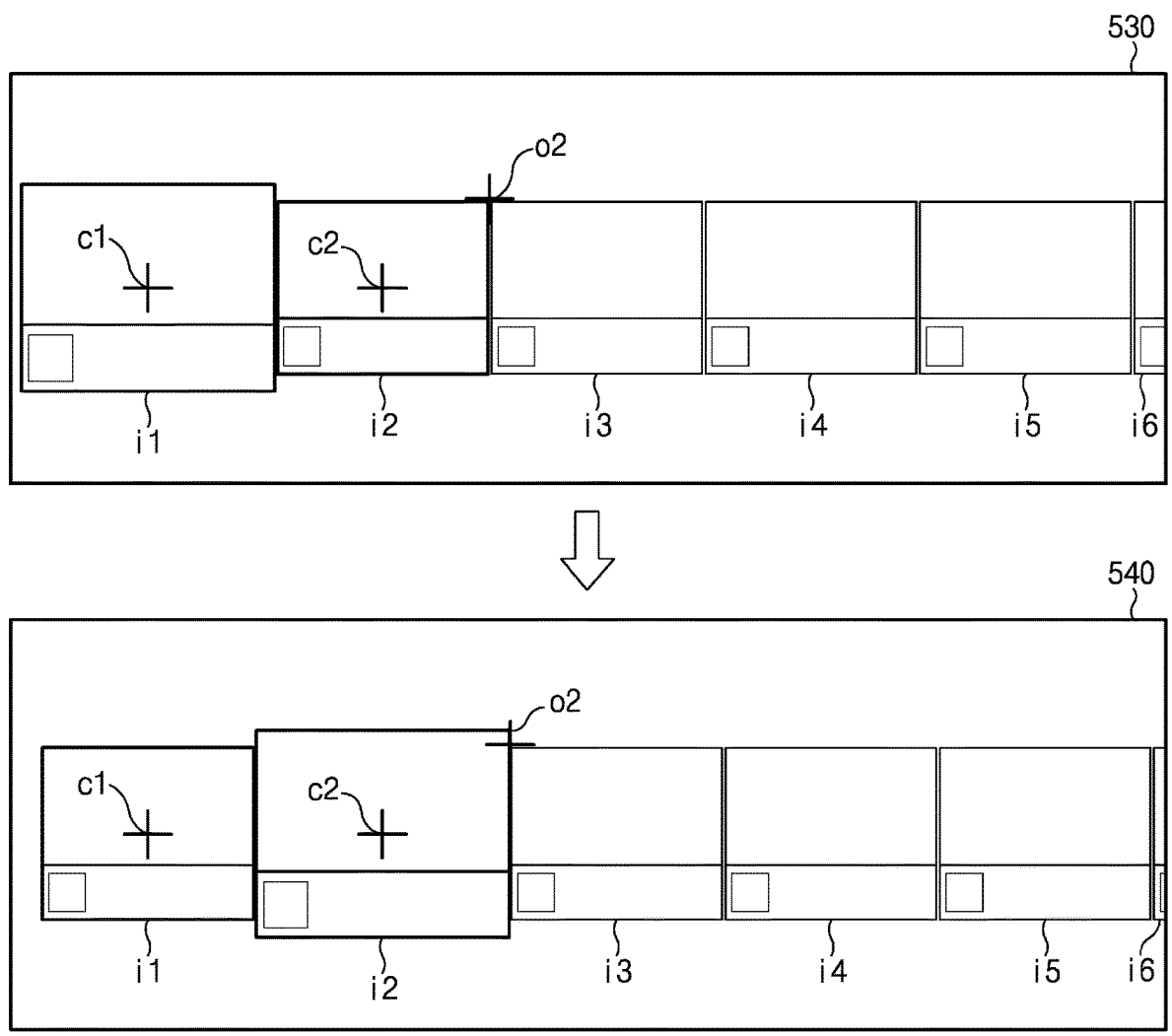
FIG. 5B is a diagram illustrating an example UI screen in a process of zooming in on a second menu icon in a state where a first menu icon is zoomed in on, according to various example embodiments of the present disclosure.
Figure 5C:
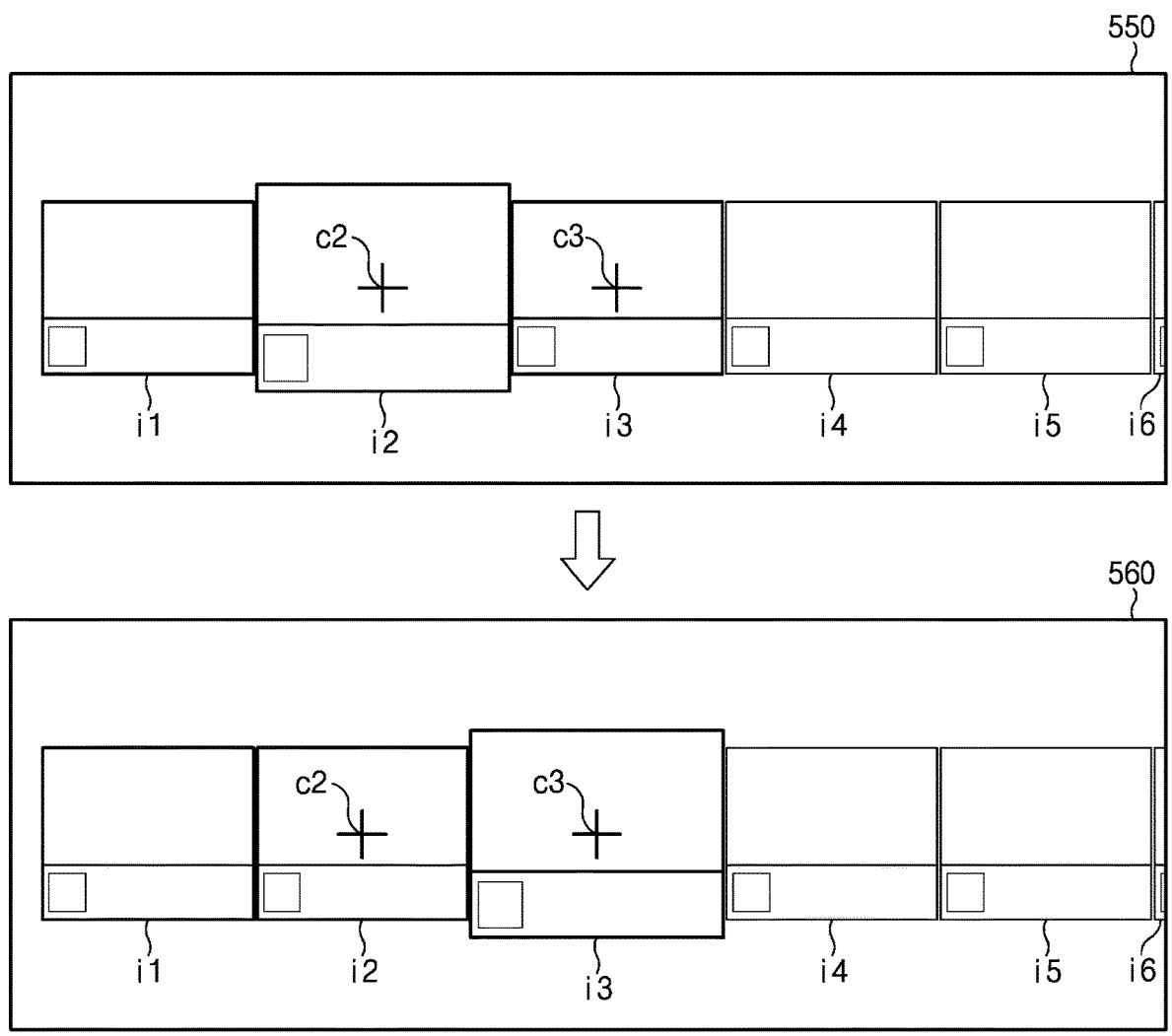
FIG. 5C is a diagram illustrating an example UI screen in a process of zooming in on a third menu icon in a state where a second menu icon is zoomed in on, according to various example embodiments of the present disclosure.

FIGS. 5A, 5B and 5C are diagrams illustrating an example process of zooming in on and moving a menu icon depending on a sort order of the menu icon according to various example embodiments of the present disclosure. FIGS. 5A to 5C are diagrams illustrating an example in which zoom-in magnifications (or size) of menu icons are the same as each other.

FIG. 5A is a diagram illustrating an example UI screen in a process of zooming in on a first menu icon of a menu icon list according to various example embodiments of the present disclosure.

Referring to FIG. 5A, in operation 510, a processor 140 of FIG. 4 may receive a first signal for specifying a primary menu icon (hereinafter referred to as "first menu icon i1") of a menu icon list from an input module 110 of FIG. 4. For example, the first signal may be transmitted from the input module 110 if the input module 110 detects or receives a user input for moving a cursor to a location of the first menu icon i1 in a state where the menu icon list is displayed on a display 120. As another embodiment, although the first signal is not received, the processor 140 may perform operation 520 below to highlight the first menu icon i1 when the menu icon list is displayed.

In operation 520, if receiving the first signal, the processor 140 may zoom in on the first menu icon i1 from a first size to a second size. For example, the processor 140 may extend the first menu icon i1 to the left by x1, may extend the first menu icon i1 to the right by x1, may extend the first menu icon i1 to the top by y1, and may extend the first menu icon i1 to the bottom by y1. As a result, the processor 140 may zoom in on the first menu icon i1 from the first size (e.g., s1=w1×h1) to the second size (e.g., s2={(w1+(2×x1))+(h1+(2×y2))}). For another example, a center c1 of the zoomed-in first menu icon i1 may not be moved, and a coordinate of an edge o1 of a right upper end may be moved by a coordinate (x1, y1).

In operation 520, if the first menu icon i1 is zoomed in on, the processor 140 may move locations of other menu icons i2 to i6 by a value (x1−b1) in which a blank space b1 between the first and second menu icons i1 and i2 is subtracted from a left extension length x1 of the first menu icon i1. Thus, in various example embodiments, the processor 140 may prevent the zoomed-in first menu icon i1 from being overlaid with the other menu icons i2 to i6 including the second menu icon i2.

FIG. 5B is a diagram illustrating an example UI screen in a process of zooming in on a second menu icon in a state where a first menu icon is zoomed in on, according to various example embodiments of the present disclosure.

In operation 530, a processor 140 of FIG. 4 may receive a second signal for specifying a second menu icon i2 from an input module 110 of FIG. 4 in a state where a first menu icon i1 is zoomed in on. The second signal may be, for example, a signal transmitted from the input module 110 when a right directional key of the input module 110 is operated.

In operation 540, if receiving the second signal in a state where the first menu icon i1 is zoomed in on, the processor 140 may zoom in on a second menu icon i2 from a first size to a second size while zooming out on the first menu icon i1 from the second size to the first size. For example, since a location of the first menu icon i1 is not moved in a process of zooming in on the first menu icon i1, the processor 140 may not move the location (e.g., c1) of the first menu icon i1 when zooming out on the first menu icon i1. For another example, since a length of an available space due to zooming out of the first menu icon i1 is the same as a left extension length of the second menu icon i2, the processor 140 may not move a location (e.g., c2) of the second menu icon i2. Since a third menu icon i3 is overlaid by the second menu icon i2 when the second menu icon i2 is extended to the right, the processor 140 may move a location (e.g., o2) of other menu icons i3 to i6 including the third menu icon i3 by a value (x1−b1). The value (x1−b1) may be a result of subtracting a length of a blank space b1 between the second menu icon i2 and the third menu icon i3 from an extension length x1 of the second menu icon i2 toward the sort direction of the menu icons.

FIG. 5C is a diagram illustrating an example UI screen in a process of zooming in on a third menu icon in a state where a second menu icon is zoomed in on, according to various example embodiments of the present disclosure.

In operation 550, a processor 140 of FIG. 4 may receive a third signal for specifying a third menu icon i3 from an input module 110 of FIG. 4 in a state where a second menu icon i2 of a menu icon list is zoomed in on. The third signal may be a signal transmitted from the input module 110 when a right directional key of the input module 110 is operated.

In operation 560, when receiving the third signal in a state where the second menu icon i2 is zoomed in on, the processor 140 may zoom out on the second menu icon i2 from a second size to a first size and may zoom in on a third menu icon i3 using an available space due to the zooming out of the second menu icon i2. For example, when zooming out on the second menu icon i2, the processor 140 may move a location (e.g., c2) of the second menu icon i2 to the left by a value (x1−b1). The value (x1−b1) may be a value in which a location of the second menu icon i2 is moved in the process of zooming in on the second menu icon i2. For another example, the processor 140 may move a location (e.g., c3) of the third menu icon i3 to the left by a value (x1−b1) using an available space due to the zooming out of the second menu icon i2. The value (x1−b1) may be a result of subtracting a length of a blank space b1 between the third menu icon i3 and a fourth menu icon i4 from an extension length x1 of the third menu icon i3 toward a start direction of menu icons.

Meanwhile, if zoom-in magnifications of menu icons of a menu icon list are the same as each other, the process of zooming in on the menu icons in FIG. 5C may be applied in the same manner when menu icons i4 to i6 subsequent to the third menu icon i3 are zoomed in on.

Figure 6:
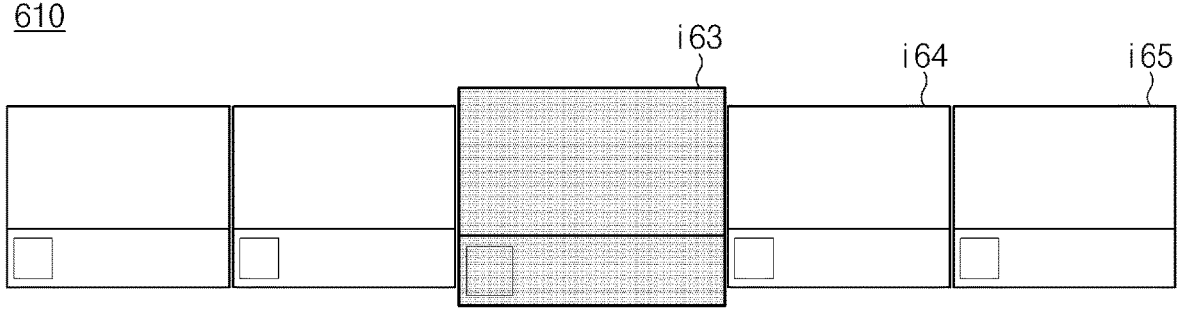
FIG. 6 is a diagram illustrating an example UI screen if a fourth menu icon of a menu icon list is zoomed in on at a zoom-in magnification different from that of a third menu icon according to various example embodiments of the present disclosure.
Figure 6:
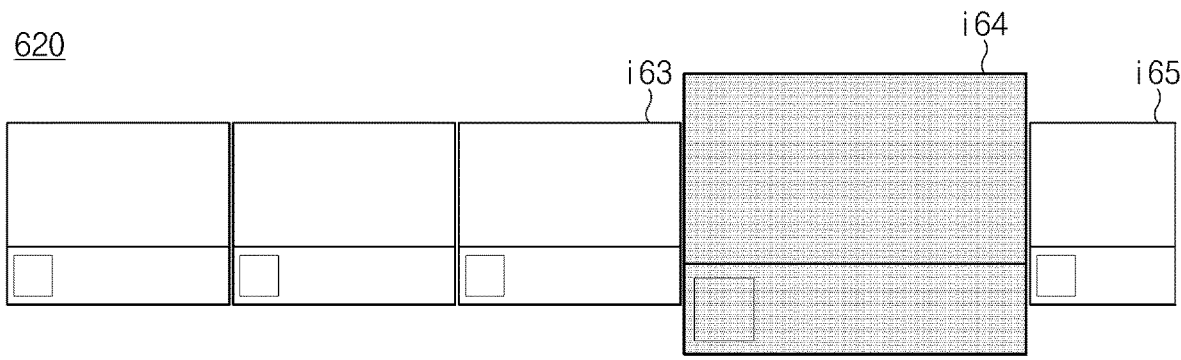

FIG. 6 is a diagram illustrating an example UI screen if a fourth menu icon of a menu icon list is zoomed in on at a zoom-in magnification different from that of a third menu icon according to various example embodiments of the present disclosure.

Referring to FIG. 6, in operation 610, a processor 140 of FIG. 4 may receive a fourth signal for specifying a fourth menu icon i64 in a state where a third menu icon i63 is zoomed in on. The fourth signal may be, for example, a signal transmitted from an input module 110 of FIG. 4 when a right directional key of the input module 110 is operated.

In operation 620, if receiving the fourth signal, the processor 140 may zoom out on the third menu icon i63 from a second size to a first size and may zoom in on the fourth menu icon i64 from the first size to a third size (the third size>the second size) using an available space due to the zooming out of the third menu icon i63. Since the fourth menu icon i64 is zoomed in on to a size which is larger than that of the third menu icon i64, if it is zoomed in on to only an available space due to the zooming out of the third menu icon i63, it may be overlaid on a fifth menu icon i65. To avoid this, the processor 140 may move a location of the fifth menu icon i65 in a right direction by a difference between the second size and the third size.

Figure 7:
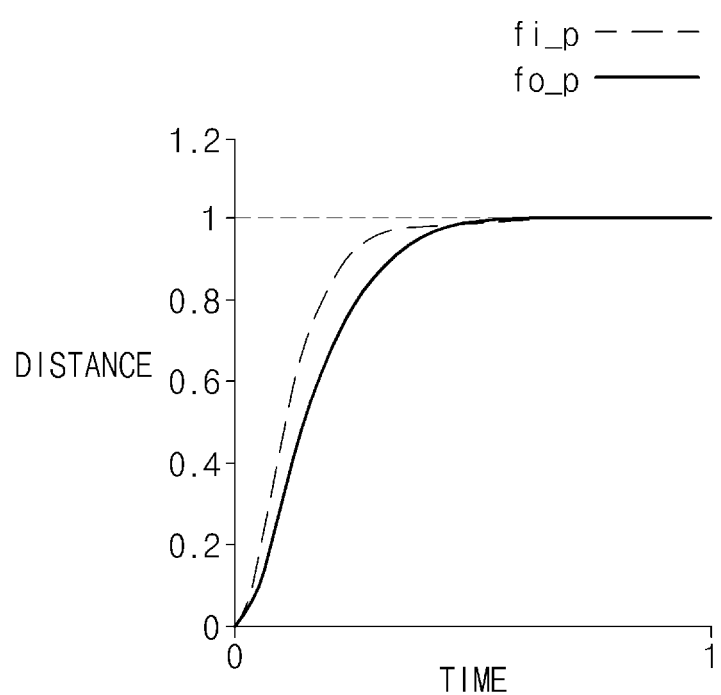
FIG. 7 is a graph illustrating an example change in location over time in a process of zooming in or out on a menu icon according to various example embodiments of the present disclosure.

FIG. 7 is a graph illustrating an example change in location over time in a process of zooming in or out on a menu icon according to various example embodiments of the present disclosure.

Referring to FIG. 7, according to various example embodiments, a processor 140 of FIG. 4 may move a location of a zoomed-in menu icon to be relatively faster than a zoomed-out menu icon. In FIG. 7, point 0 of an x-axis may be a zoom-in or zoom-out start time, and point 1 of the x-axis may be a zoom-in or zoom-out completion time. Point 0 of a y-axis may be an initial location of a menu icon, a location of which is moved in a zoom-in or zoom-out process, and point 1 of the y-axis may be a location where movement of a menu icon, a location of which is moved, is completed. In FIG. 7, fi_p is a graph illustrating a change in location over a time of a zoomed-in menu icon and fo_p is a graph illustrating a change in location over a time of a zoomed-out menu icon. Thus, in various example embodiments, a zoomed-in (highlighted) menu icon may be easily detected in a user's view.

Figure 8:
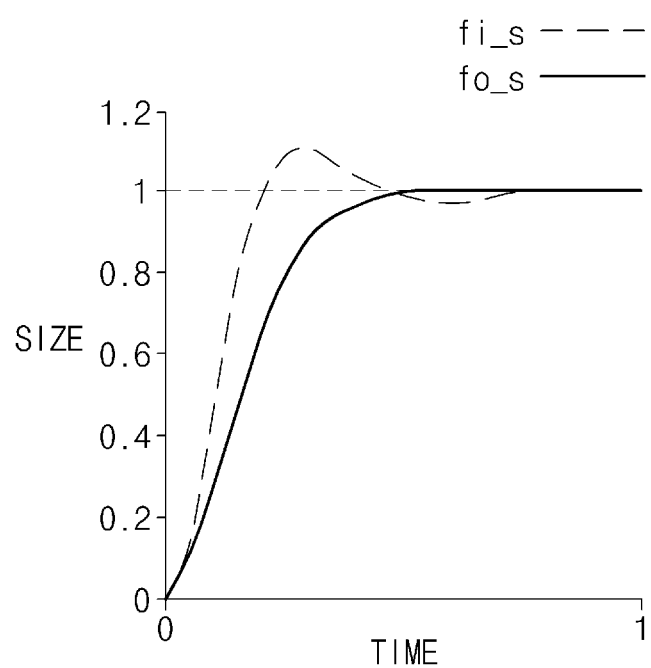
FIG. 8 is a graph illustrating an example change in size over time in a process of zooming in or out on a menu icon according to various example embodiments of the present disclosure.

FIG. 8 is a graph illustrating an example change in size over time in a process of zooming in or out a menu icon on according to various example embodiments of the present disclosure.

Referring to FIG. 8, according to various example embodiments, a processor 140 of FIG. 4 may change a zoomed-in menu icon in size to be relatively faster than a zoomed-out menu icon. In FIG. 8, point 0 of an x-axis may be a zoom-in or zoom-out start time, and point 1 of the x-axis may be a zoom-in or zoom-out completion time. Point 0 of a y-axis may be an initial size of a zoomed-in or zoomed-out menu icon, and point 1 of the y-axis may be the last size (e.g., a second size) of the zoomed-in or zoomed-out menu icon. In FIG. 8, fi_s is a graph illustrating a change in size over a time of a zoomed-in menu icon and fo_s is a graph illustrating a change in size over a time of a zoomed-out menu icon. Therefore, in various example embodiments, a zoomed-in (highlighted) menu icon may be easily detected in a user's view.

According to various example embodiments, the processor 140 may change a size of a menu icon in a form where the size of the menu icon converges to the second size to highlight a process of zooming in on the menu icon (refer to fi_s). For example, the processor 140 may perform a process, for zooming in on a specified menu icon from a first size to a third size and zooming out on the specified menu icon to a fourth size of less than a second size, once and may zoom in on the specified menu icon to the second size. Therefore, in various example embodiments, a highlighted menu icon may be easily detected in a user's view.

Figure 9:
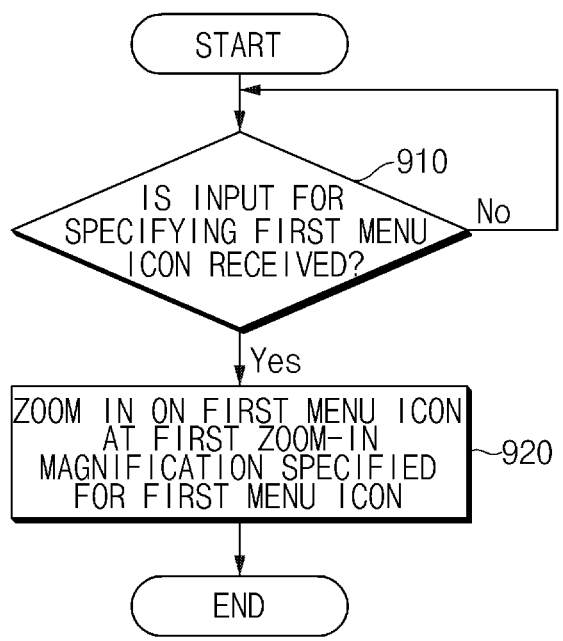
FIG. 9 is a flowchart illustrating an example method for highlighting a menu icon according to various example embodiments of the present disclosure.

FIG. 9 is a flowchart illustrating an example method for highlighting a menu icon according to various example embodiments of the present disclosure.

Referring to FIG. 9, in operation 910, a processor 140 of FIG. 4 may determine whether a signal for specifying a first menu icon of a menu icon list is received from an input module 110 of FIG. 4. The signal may be a signal received as a user input which enters a menu for displaying the menu icon list is operated. The signal may be a signal received as a user input for changing and specifying another menu icon is operated in a state where one menu icon of the menu icon list is highlighted (zoomed in on).

In operation 920, the processor 140 may zoom in on the first menu icon corresponding to the received signal at a first zoom-in magnification. The first zoom-in magnification may be a zoom-in magnification specified for the first menu icon and may differ from a zoom-in magnification of a second menu icon in the menu icon list. For example, the zoom-in magnifications may be specified to be bigger for a menu icon which requires more emphasis. According to various example embodiments, the processor 140 may zoom in further for a menu icon which requires more emphasis. Thus, in various example embodiments, a user may focus more on a menu icon which requires more attention among menu icons.

Figure 10:
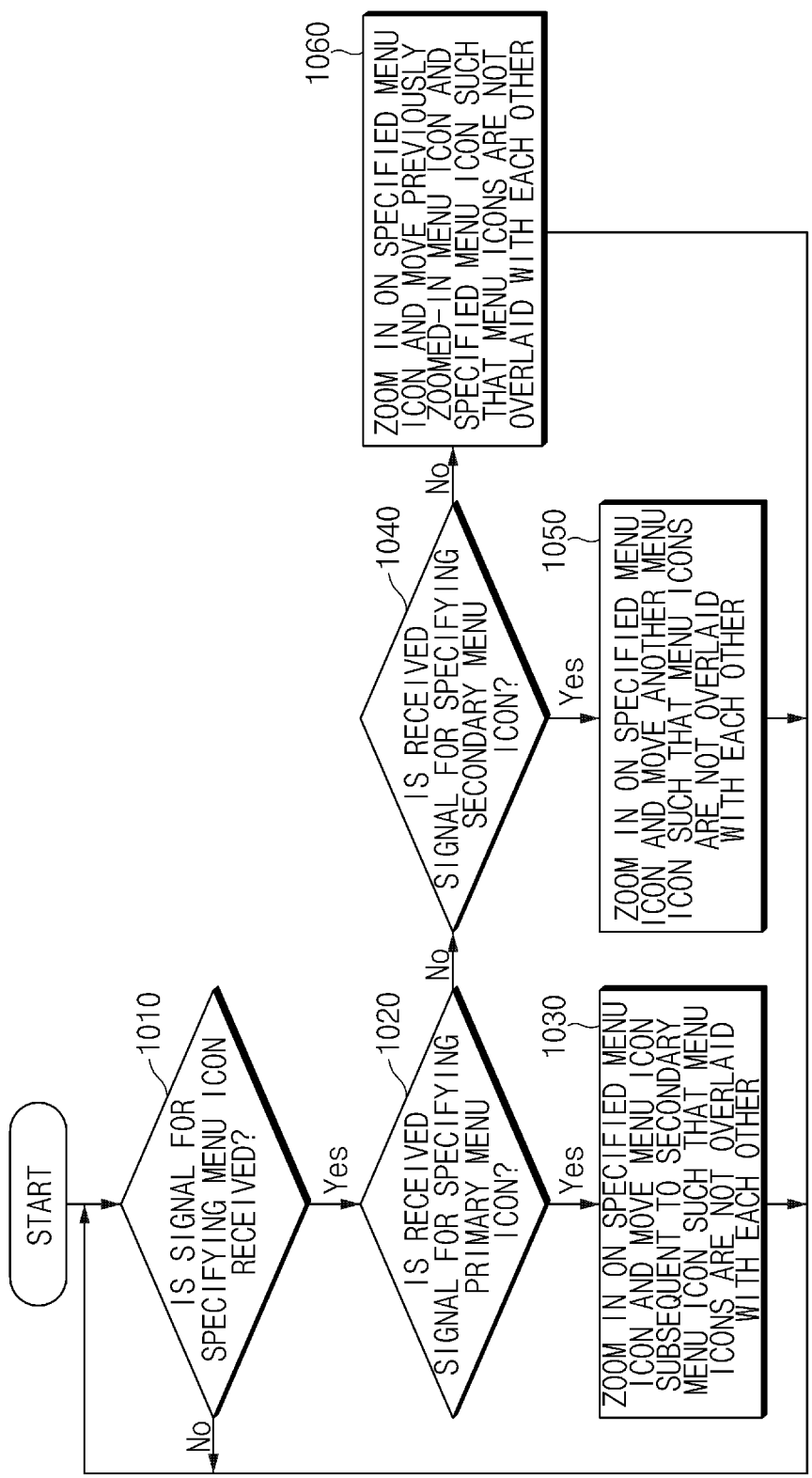
FIG. 10 is a flowchart illustrating an example method for highlighting a menu icon according to an example embodiment of the present disclosure.

FIG. 10 is a flowchart illustrating an example method for highlighting a menu icon according to an example embodiment of the present disclosure. In FIG. 10, an example embodiment of the present disclosure is exemplified as a menu icon is highlighted if all of zoom-in magnifications of menu icons are the same as each other.

Referring to FIG. 10, in operation 1010, a processor 140 of FIG. 4 may determine whether a signal for specifying one menu icon of a menu icon list is received from an input module 110 of FIG. 4. The signal may be a signal received, for example, as a user input which enters a menu for displaying the menu icon list is operated using the input module 110. The signal may be a signal received as a user input for changing and specifying another menu icon is operated in a state where one menu icon of the menu icon list is highlighted (zoomed in on).

If receiving the signal for changing and specifying the menu icon, in operation 1020, the processor 140 may determine whether the received signal is for specifying a primary menu icon.

If the received signal is for specifying the primary menu icon, in operation 1030, the processor 140 may zoom in on the specified menu icon (the primary menu icon) and may move another menu icon (a menu icon subsequent to a secondary menu icon) such that menu icons are overlaid with each other.

In operation 1040, if the received signal is not for specifying the primary menu icon, the processor 140 may determine whether the received signal is for specifying the secondary menu icon of the menu icon list.

If the received signal is for specifying the secondary menu icon, in operation 1050, the processor 140 may zoom in on the specified menu icon (the secondary menu icon) and may move another menu icon (e. g. a tertiary menu icon) such that menu icons are not overlaid with each other.

If the received signal is not for specifying the secondary menu icon of the menu icon list, in operation 1060, the processor 140 may zoom in on the specified menu icon and may move the specified menu icon and a previously specified menu icon while zooming out on the previously zoomed. The processor 140 may zoom in on the specified menu icon using a region obtained while zooming out on the previously zoomed-in menu icon.

In operations 1010 to 1060 described above, the processor 140 may maintain a blank space between menu icons. For example, the processor 140 may zoom in on a specified menu icon such that a blank space before zooming in on a menu icon is the same as a blank space after zooming in on the menu icon. Alternatively, the processor 140 may additionally use a blank space between menu icons. For example, the processor 140 may zoom in on a specified menu icon such that there is no blank space between a zoomed-in menu icon and a menu icon adjacent to the zoomed-in menu icon.

Figure 11:
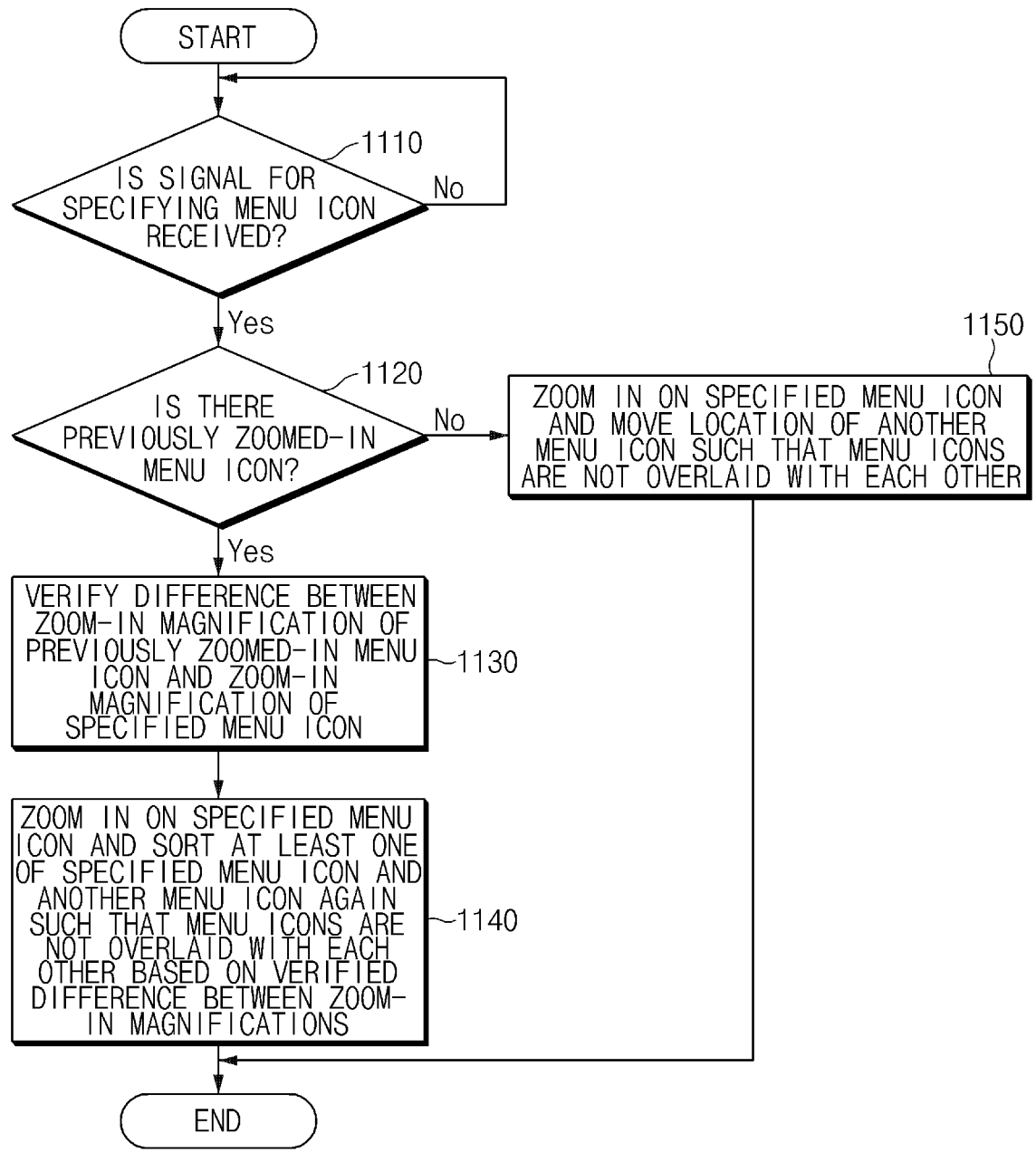
FIG. 11 is a flowchart illustrating an example method for highlighting a menu icon according to another example embodiment of the present disclosure.

FIG. 11 is a flowchart illustrating an example method for highlighting a menu icon according to another example embodiment of the present disclosure. In FIG. 11, a description will be given of a method for highlighting a menu icon if zoom-in magnifications of menu icons are different from each other.

In operation 1110, a processor 140 of FIG. 4 may determine whether a signal for specifying one menu icon of a menu icon list is received from an input module 110 of FIG. 4. The signal may be a signal received as a user input which enters a menu for displaying the menu icon list is operated using the input module 110. The signal may be a signal received as a user input for changing and specifying another menu icon is operated in a state where one menu icon of the menu icon list is highlighted (zoomed in on).

If the signal is received, in operation 1120, the processor 140 may determine whether there is a previously zoomed-in menu icon.

If there is the previously zoomed-in menu icon, in operation 1130, the processor 140 may verify a zoom-in magnification of the previously zoomed-in menu icon and a zoom-in magnification of a currently specified menu icon. For example, the processor 140 may verify a difference between the zoom-in magnifications.

In operation 1140, the processor 140 may zoom in on a specified menu icon and may sort at least one of the specified menu icon and another menu icon again such that menu icons are not overlaid with each other based on the difference between zoomed-in magnifications. For example, if the zoom-in magnification of the previously zoomed-in menu icon is the same as the zoom-in magnification of the currently specified menu icon and the specified menu icon is tertiary, the processor 140 may move the previously zoomed-in menu and the currently specified menu icon. For another example, if the zoom-in magnification of the previously zoomed-in menu icon is higher than the zoom-in magnification of the currently specified menu icon, the processor 140 may move at least one of the previously zoomed-in menu icon and the currently specified menu icon in the direction of generating an available space due to the zooming out of the previously zoomed-in menu icon. For another example, if the zoom-in magnification of the previously zoomed-in menu icon is lower than the zoom-in magnification of the currently specified menu icon, the processor 140 may move at least one of the previously zoomed-in menu icon and the currently specified menu icon in a direction opposite to the direction of generating an available space due to the zooming out of the previously zoomed-in menu icon.

If there is no the previously zoomed-in menu icon, in operation 1150, the processor 140 may zoom in on the specified menu icon and may move a location of another menu icon such that menu icons are not overlaid with each other.

In operations 1110 to 1150 described above, the processor 140 may maintain a blank space between menu icons. For example, the processor 140 may zoom in on a specified menu icon such that a blank space before zooming in on a menu icon is the same as a blank space after zooming in on the menu icon. Alternatively, the processor 140 may additionally use a blank space between the menu icons. For example, the processor 140 may zoom in on a specified menu icon such that there is no blank space between a zoomed-in menu icon and a menu icon adjacent to the zoomed-in menu icon.

At least a part of an apparatus (e.g., modules or functions thereof) or a method (e.g., operations) according to various example embodiments may be, for example, implemented by instructions stored in a computer-readable storage medium in the form of a program module. The instruction, when executed by a processor, may cause the one or more processors to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. Also, the instruction may include a code generated by a compiler or a code executable by an interpreter. A module or a program module according to various example embodiments may include at least one of the above elements, or a part of the above elements may be omitted, or additional other elements may be further included. Operations performed by a module, a program module, or other elements according to various example embodiments may be executed sequentially, in parallel, repeatedly, or in a heuristic method. In addition, some operations may be executed in different sequences or may be omitted. Alternatively, other operations may be added.

According to various example embodiments of the present disclosure, the display device may prevent and/or avoid information of another menu icon from being overlaid by a zoomed-in menu icon when the menu icon is zoomed in on.

A module or a program module according to various example embodiments may include at least one of the above elements, or a part of the above elements may be omitted, or additional other elements may be further included. Operations performed by a module, a program module, or other elements according to various example embodiments may be executed sequentially, in parallel, repeatedly, or in a heuristic method. In addition, some operations may be executed in different sequences or may be omitted. Alternatively, other operations may be added. While the present disclosure has been shown and described with reference to various example embodiments thereof, it will be understood by those skilled in the art that various changes in form and details may be made therein without departing from the spirit and scope of the present disclosure as defined by the appended claims and their equivalents.

While the present disclosure has been described with reference to various example embodiments, it is to be understood that the various example embodiments are intended to be illustrative, and not limiting. It will be understood by one skilled in the art that various modifications, variations and alternatives may be realized without departing from the true spirit and scope of the disclosure as defined by the appended claims.

What is claimed is:

1. A display device, comprising:
a display;
an input module comprising input circuitry configured to receive an input from at least one input device; and
a processor configured to:
control the display to simultaneously display a plurality of user interface (UI) items including a first UI item and a second UI item in single horizontal line, wherein each of the plurality of UI items has a same original size,
in response to receiving an input selecting the first UI item from the plurality of UI items, zoom in on the first UI item at a first zoom-in magnification from its original size,
in response to receiving an input selecting the second UI item from the plurality of UI items after zooming in on the first UI item, zoom in on the second UI item at a second zoom-in magnification from its original size, and zoom out the first UI item to the original size, and
determine whether the second UI item is an $n^{th}$ UI item of the plurality of UI items,
in response to determining that the second UI item is a primary UI item or a secondary UI item, move at least one UI item of the plurality of UI items in a horizontal direction, and
in response to determining that the second UI item is a tertiary UI item or a UI item subsequent to the tertiary UI item, move the at least one UI item in the horizontal direction and move the first UI item in an opposite direction that is opposite to the direction in which the at least one UI item is moved.

2. The display device of claim 1, wherein the processor is configured to:
zoom in on the first UI item at the first zoom-in magnification by zooming in on the first UI item from a first size to a second size and zooming out the first UI item from the second size to a third size less than the second size.

3. The display device of claim 2, wherein the processor is configured to:
perform zooming in on the first UI item to the second size and zooming out the first UI item from the second size to a fourth size of greater than the first size and less than the third size at least once; and
zoom in on the first UI item at the first zoom-in magnification.

4. The display device of claim 1, wherein the processor is configured to:
based on zooming in on the first UI item or the second UI item, move the at least one UI item such that there is no blank space between a UI item adjacent to the zoomed-in UI item and the zoomed-in UI item.

5. The display device of claim 1, wherein the processor is configured to:
based on zooming in on the first UI item or the second UI item, move the at least one UI item to maintain a blank space between a UI item adjacent to the zoomed-in UI item and the zoomed-in UI item.

6. The display device of claim 1, wherein each of the UI items of the plurality of UI items includes an information region and a background region, and
wherein the processor is configured to:
based on zooming in on the first UI item or the second UI item, move the at least one UI item such that an information region of the at least one UI item is not overlaid by the zoomed-in UI item.

7. The display device of claim 1, wherein the processor is configured to:
zoom out the zoomed-in first UI item to an original size and zoom in on the second UI item using a blank space obtained by the zooming out of the first UI item.

8. The display device of claim 1,
wherein the first UI item zoomed in at the first zoom-in magnification is bigger than the second UI item zoomed in at the second zoom-in magnification such that the first UI item is more emphasized than the second UI item.

9. A display method performed by at least one processor, the method comprising:
displaying a plurality of user interface (UI) items including a first UI item and a second UI item in single horizontal line, wherein each of the plurality of UI items has a same original size;
in response to receiving an input selecting the first UI item from the plurality of UI items, zooming in on the first UI item at a first zoom-in magnification from its original size;
in response to receiving an input selecting the second UI item from the plurality of UI items after zooming in on the first UI item, zooming in on the second UI item at a second zoom-in magnification from its original size and zooming out the first UI item to the original size;
determining whether the second UI item is an $n^{th}$ UI item of the plurality of UI items;
in response to determining that the second UI item is a primary UI item or a secondary UI item, moving at least one UI item of the plurality of UI items in a horizontal direction; and
in response to determining that the second UI item is a tertiary UI item or a UI item subsequent to the tertiary UI item, moving the at least one UI item in the horizontal direction and moving the first UI item in an opposite direction that is opposite to the direction in which the at least one UI item is moved.

10. The method of claim 9, wherein the zooming in of the first UI item comprises zooming in on the first UI item from a first size to a second size, and
wherein the zooming out of the first UI item comprises zooming out the first UI item from the second size to a third size less than the second size.

11. The method of claim 10, wherein the zooming out of the first UI item further comprises:

zooming out the first UI item from the second size to a fourth size of less than the second size and greater than the first size; and zooming in on the first UI item from the fourth size to the second size.

12. The method of claim 9, wherein the moving of the at least one UI item comprises:

based on zooming in on the first UI item or the second UI item, moving the at least one UI item such that there is no blank space between a UI item adjacent to the zoomed-in UI item and the zoomed-in UI item.

13. The method of claim 9, wherein the moving of the at least one UI item comprises:

based on zooming in on the first UI item or the second UI item, moving the at least one UI item to maintain a blank space between a UI item adjacent to the zoomed-in UI item and the zoomed-in UI item.

14. The method of claim 9, wherein each of the UI items of the plurality of UI items includes an information region and a background region, and wherein the moving of the at least one UI item comprises:

moving the at least one UI item such that the information region of the at least UI item is not overlaid by the zoomed-in UI item.

15. The method of claim 9, wherein the zooming in of the second UI item comprises:

zooming in on the second UI item using a blank space obtained by the zooming out of the first UI item.

16. A non-transitory computer-readable storage medium having embodied thereon a program which, when executed by a processor, causes the processor to perform a method, the method comprising:

displaying a plurality of user interface (UI) items including a first UI item and a second UI item in single horizontal line, wherein each of the plurality of UI items has a same original size;

in response to receiving an input selecting the first UI item from the plurality of UI items, zooming in on the first UI item at a first zoom-in magnification from its original size;

in response to receiving an input selecting the second UI item from the plurality of UI items after zooming in on the first UI item, zooming in on the second UI item at a second zoom-in magnification from its original size;

determining whether the second UI item is an $n^{th}$ UI item of the plurality of UI items;

in response to determining that the second UI item is a primary UI item or a secondary UI item, moving at least one UI item of the plurality of UI items in a horizontal direction; and in response to determining that the second UI item is a tertiary UI item or a UI item subsequent to the tertiary UI item, moving the at least one UI item in the horizontal direction and moving the first UI item in an opposite direction that is opposite to the direction in which the at least one UI item is moved.

* * * * *